United States Patent [19]

Ullakko et al.

[11] 4,086,441
[45] Apr. 25, 1978

[54] MESSAGE-WAITING AND DO-NOT-DISTURB COMMUNICATIONS SYSTEM

[75] Inventors: Richard J. Ullakko, Kirkland; Gerald L. Edwards, Seattle, both of Wash.

[73] Assignee: Tone Commander Systems, Inc., Redmond, Wash.

[21] Appl. No.: 759,359

[22] Filed: Jan. 14, 1977

[51] Int. Cl.² .................................................. H04M 3/42
[52] U.S. Cl. .................................................. 179/84 C
[58] Field of Search ................ 179/84 C, 84 B, 84 L, 179/84 SS, 99

[56] References Cited

U.S. PATENT DOCUMENTS

| | | | |
|---|---|---|---|
| 3,050,592 | 8/1962 | Burgener | 179/84 C |
| 3,320,368 | 5/1967 | Applebaum | 179/84 C |
| 3,826,876 | 7/1974 | Gueldenpfenning | 179/84 C |
| 3,928,732 | 12/1975 | Simon | 179/84 L |

Primary Examiner—Kathleen H. Claffy
Assistant Examiner—Joseph A. Popek
Attorney, Agent, or Firm—Dowrey & Cross

[57] ABSTRACT

The system includes a central station console and one or more remote station modules. Corresponding message-waiting indicators mounted by the central station console and each remote station module are accessed and controlled from the central station on a selective individual basis; but can be controlled alternatively from the remote station modules in order to indicate message-received. Corresponding do-not-disturb indicators mounted by the central station console and each remote station module are controlled exclusively from the latter. For telephone application, the do-not-disturb indicators additionally may be operated in a flashing mode when the associated telephone set assumes off-hook condition in order to provide call status indication. The central station message-waiting and do-not-disturb indicators are connected electrically with corresponding remote station indicators by individual signalling paths, each consisting of a pair of electrical conductors along which bidirectional current flow respectively constitutes the message-waiting (or message-received) and do-not-disturb signals.

26 Claims, 14 Drawing Figures

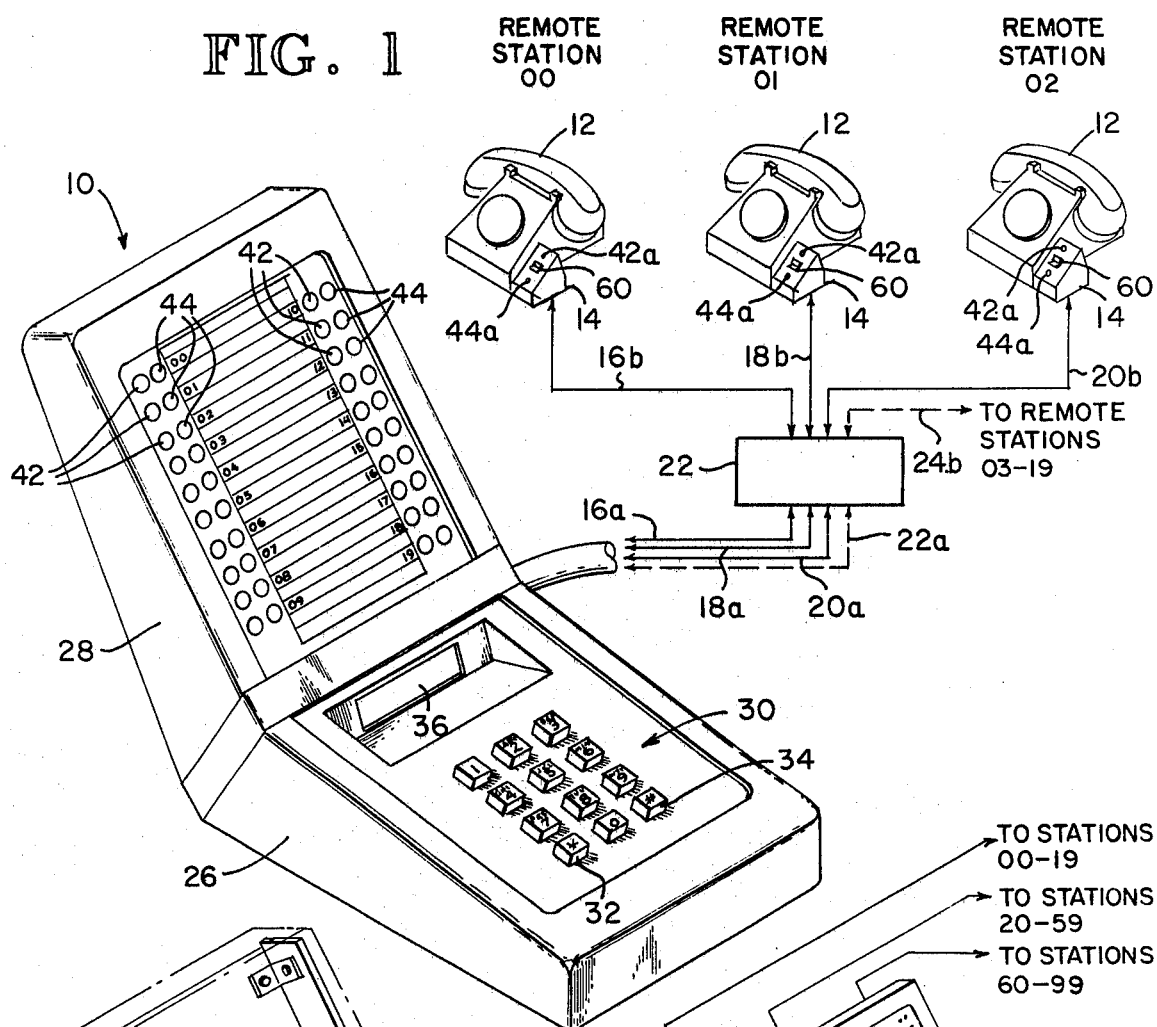
FIG. 1
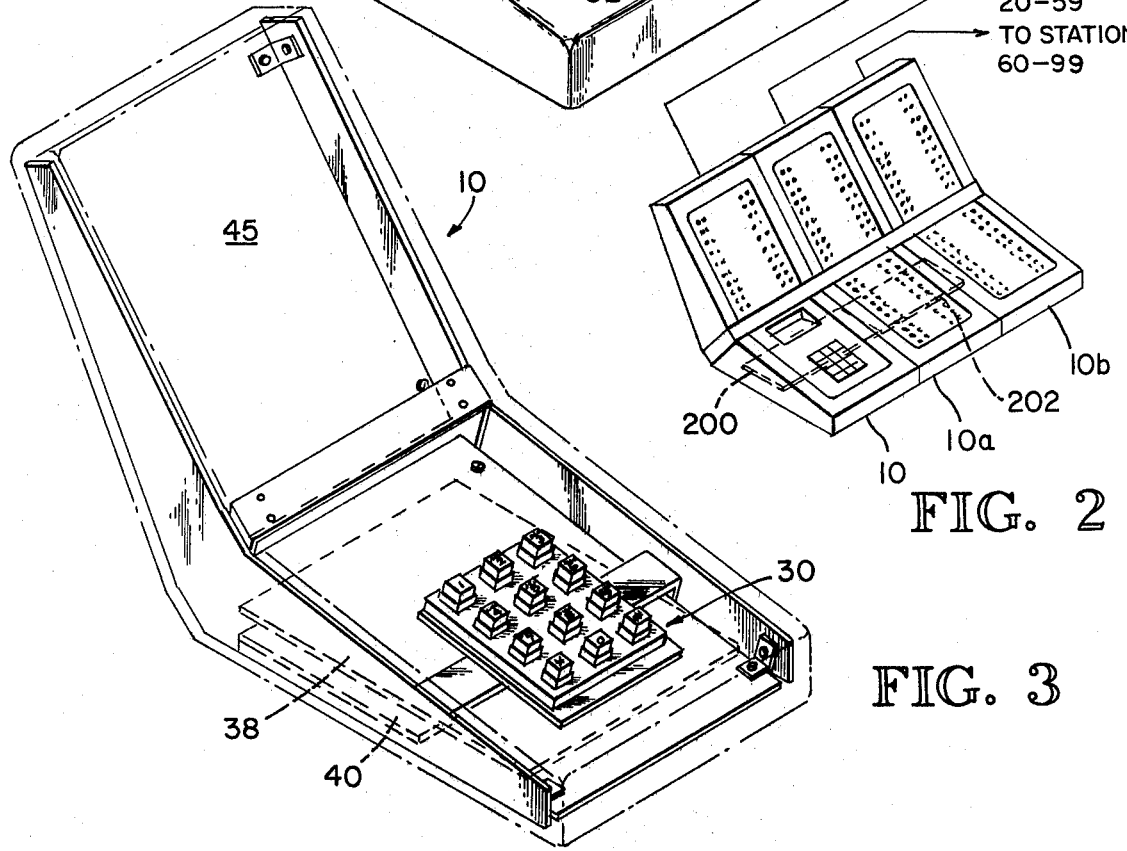
FIG. 2
FIG. 3

MESSAGE-WAITING AND DO-NOT-DISTURB COMMUNICATIONS SYSTEM

BACKGROUND OF THE INVENTION

This invention relates to communication systems and, more particularly, to communications systems for transmitting message-waiting and/or do-not-disturb signals between one or more remote communication stations and a central communication station. One application of this invention illustrated and described herein is a telephone related communication system for providing two-way communication between a group of remote telephone stations and a central telephone receptionist or operator station — do-not-disturb and/or message-received signals (the inverse of message-waiting signals) passing individually from the remote station to the central station, and message-waiting signals passing individually from the central station to the remote stations. The invention, however, may be utilized in other applications and environments.

The concepts of message-waiting or do-not-disturb, or combination message-waiting and do-not-disturb communication, heretofore have been applied principally to private branch exchange (PBX) telephone systems. In the PBX systems disclosed in U.S. Pat. Nos. 3,564,148 and 3,826,876, the central switchboard operator controls both the message-waiting and do-not-disturb indications, the latter in response to a request from a subscriber, using couplex switching and access circuitry. Generally similar message-waiting indications are provided for PBX application in the systems disclosed in U.S. Pat. Nos. 3,934,098, 3,532,832, 3,050,592 and 2,884,491.

A message-waiting lamp control circuit for so-called "key telephone" application is disclosed in U.S. Pat. No. 3,743,792. (Key telephone equipment is characterized by line pick-up, hold keys and signalling lamps mounted by the base of the telephone set and generally is utilized to provide intercom service among two or more subscriber telephone stations — the switching functions being initiated manually by actuation of the appropriate pick-up or hold key.) Compared to the PBX related systems mentioned hereinabove, this circuit offers simplified control functions; however, it offers only limited versatility from the standpoints of the type of information which can be transmitted and the manner in which it is transmitted. The circuit essentially affords only message-waiting or message-received (the inverse of message-waiting) communication between two key telephone stations using a signalling path made up of two electrical leads, plus ground, and one lamp at each station. It utilizes key telephone operations in the form of momentary key depressions to control message-waiting lamp indications at the called and calling sets. Additional telephone-related communications systems are disclosed in U.S. Pat Nos. 3,819,873, 3,784,721, 3,683,121, and 3,320,368.

SUMMARY OF THE INVENTION

This invention provides both message-waiting and do-not-disturb bi-directional communication between a central station and one or more remote stations. According to one preferred embodiment of the invention, message-waiting indications may be effected from a central station at one or more remote stations on a selective individual basis while do-not-disturb indications may be effected correspondingly from each remote state at the central station. Message-received indications additionally may be effected from each remote station at the central station, such indications preferably constituted by inverse message-waiting indications. For telephone or other related application, the aforementioned do-not-disturb signals further may be effected when a telephone set associated with the respective remote station assumes off-hook status.

According to further principles of the invention, the central station is operatively associated with each remote station by a message-waiting communication channel and a do-not-disturb communication channel which, in one preferred embodiment, are constituted by a single bi-directional signalling path along which message-waiting and do-not-disturb signals are transmitted in alternate sequence. Preferably, each signalling path includes a single electrical conductor which extends between the central station and each remote station and the aforementioned signals are constituted by bi-directional circuit flow during corresponding half cycles of alternating electrical current applied to the single conductor. The central station and the respectively associated remote station alternatively control current flow in one direction (corresponding to message-waiting signals), while the remote station exclusively controls current flow in the opposite direction (corresponding to do-not-disturb signals). Two corresponding pairs of appropriate indicators are operatively associated with each of the aforementioned signalling paths — one pair located at the central station (along with additional pairs for the remaining remote stations), the other pair located at the remote station. In each such pair, one indicator is connected for actuation by message-waiting signals, and the other is connected for actuation by do-not-disturb signals. Thus, in each indicator pair located at the central station, one indicator indicates that the message-waiting indicator at the associated remote station is operative, while the other indicates do-not-disturb. The corresponding indicator pairs at each remote station are operated simultaneously with their central station counterparts and yield complementary indications.

Thus it will be appreciated from the foregoing summary that this invention combines the versatility of central station - remote station communication heretofore afforded in complex PBX-related applications with the economy and reliability heretofore afforded in key telephone applications. The system, of course, could be utilized in either application, or both, by providing signalling paths which are independent of the PBX communication circuitry, or the key telephone intercom circuitry, as the case may be. Furthermore, although corresponding pairs of indicators are provided for each signalling path, one message-waiting indicator located at each remote station and one do-not-disturb indicator located at the central station for each remote station could be used, if desired. In the latter instance, of course, acceptable message-waiting/do-not-disturb communication between the central and remote stations is provided, although without message-received indication or concurrent indication at the transmitting station (the central or remote station, as the case may be) that a corresponding indicator is actuated at the other station.

These and other features, objects and advantages of the present invention will become apparent in the detailed description and claims to follow, taken in conjunction with the accompanying drawings in which like parts bear like reference numerals.

BRIEF DESCRIPTION OF THE DRAWINGS

FIG. 1 is a schematic of the communications system of the invention for twenty (20) station telephone application, together with perspective views of the central station console and three remote station modules of this invention;

FIG. 2 is a perspective view of the FIG. 1 central station console, together with two console extensions;

FIG. 3 is a perspective view of the FIG. 1 console with parts broken away;

DETAILED DESCRIPTION OF THE DRAWINGS

Figure 4:
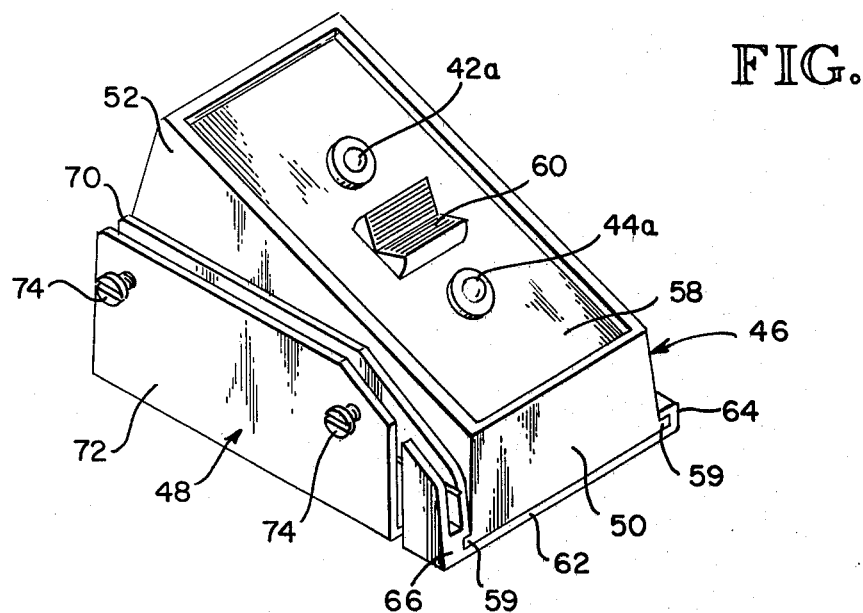
FIG. 4 is a perspective view of one FIG. 1 remote station module.
Figure 5:
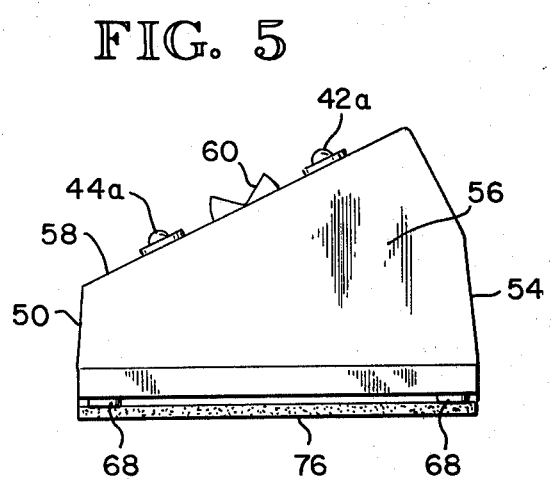
FIG. 5 is a side elevation of the FIG. 4 module.

The communication system of this invention is depicted schematically in FIG. 1 for multiple station telephone applications. The system provides message-waiting and do-not-disturb communication between a central station and one or more remote stations. In the illustrated example, a central console (referenced generally by numeral 10) is located at the central receptionist or operator station and services twenty (20) remote telephone stations which are designated, respectively, by double digit station addresses 00 - 19, inclusive. (Only three remote stations — addressed 00, 01 and 02 — are illustrated, the remaining remote stations being generally similar). The central station additionally could include a telephone set (not shown) for use by the central station operator or receptionist. Each remote station includes a telephone set 12 and a remote station module 14 mounted thereon.

The central station is operatively connected with the remote stations by respective signalling paths which afford bi-directional communication therebetween on a selective individual basis. These signalling paths are accessed on a selective individual basis by the central station, as will be described presently. In the example, the signalling paths associated with stations addressed 00, 01, and 02 are depicted by solid lines 16a,b, 18a,b, and 20a,b, all of which are routed through an intervening connector 22 of appropriate multiple channel design. Generally similar signalling paths are established to the remaining unillustrated stations, addressed 03 - 19, via connector 22, as depicted by the broken lines referenced 24a,b. Each of the illustrated signalling paths preferably is constituted by a single pair of electrical conductors, as will be described presently. The FIG. 1 signalling paths can be established using conventional telephone equipment and preferably are independent of the telephone communication intercom circuitry. Although the modules 14 are illustrated and described for use with adjacent remote telephone sets, they could be used independently of or located separately from their respectively associated telephone sets. The system of this invention additionally could be used in other applications to provide communication of the type described between the central station and one or more remote stations — the central station, one or more of the remote stations, or all stations, being equipped with other communication devices or merely including console 10 and one or more modules 14, as the case may be.

CENTRAL STATION

Referring now to the console 10 in particular (see FIG. 1), the console includes a housing having a base portion 26 and an inclined upper portion 28. The base portion mounts a standard key pad 30 which includes individual key buttons respectively corresponding to digits 0 - 9, as shown, together with two additional key buttons bearing symbols * and # (the latter respectively referenced by numerals 32 and 34). Buttons 32 and 34 control access to modules 14 as will be described presently. The base portion additionally mounts a double digit display 36, along with the FIG. 8A, 8B and FIG. 12 circuitry. The latter preferably are formed on conventional printed circuit boards 38 (FIG. 8A, 8B circuitry) and 40 (FIG. 12 circuitry) and are mounted in superimposed relation as depicted in FIG. 3.

Still referring to FIG. 1, the upper portion 28 mounts appropriate indicator pairs which respectively indicate the message-waiting and/or do-not-disturb status of the remote stations. Each pair includes a message-waiting indicator 42 and a do-not-disturb indicator 44. The indicator pairs are arranged in two vertically staggered columns adjacent the edges of portion 28 to provide individual spaces therebetween for displaying appropriate station address information, personnel names etc. Indicators 42, 44 are operated by the FIG. 9 circuitry which, in the example, is formed on a conventional printed circuit board 45 mounted by portion 28 as shown (FIG. 3). The preferred indicators are light emitting diodes (LED) and most preferably indicators 42 are red LED's while indicators 44 are yellow LED's, although other types of visual indicators could be used.

REMOTE STATION MODULES

The FIG. 1 remote station modules are generally similar. Referring now to FIGS. 4 - 7, each remote station module includes a housing 46 and a telephone mount 48. The housing 46 includes vertical side walls 50, 52, 54 and 56, inclined top wall 58, and is open at the bottom. Rib portions 59 project transversely from the lower edges of walls 52, 56. Wall 58 mounts a rocker switch 60 and indicators 42a and 44a. The illustrated indicator pair constitute the remote station counterparts for the corresponding central station indicator pair and are operated simultaneously therewith as will be described. Likewise, indicators 42a and 44a preferably are constituted by a red LED and a yellow LED.

The mount 48 of FIGS. 4 – 7 includes a base 62 having an outline which registers with the outline of housing 46. Base 62 includes upstanding side portions 64 and 66 which overlap and engage housing rib portions 59 in order to secure the housing and mount together. Screws 68 extend through base 62 and threadedly engage wall 52 so as to maintain the housing and mount in the illustrated assembled condition.

Figure 6:
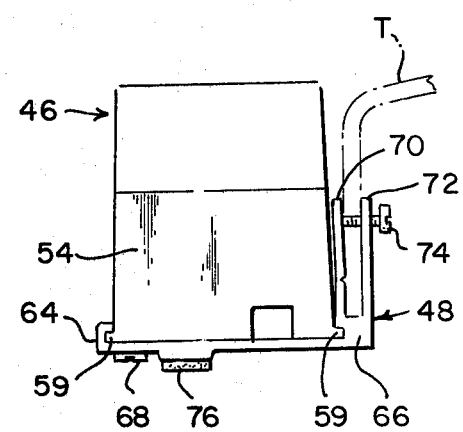
FIG. 6 is a rear end elevation of the FIG. 4 module.
Figure 7:
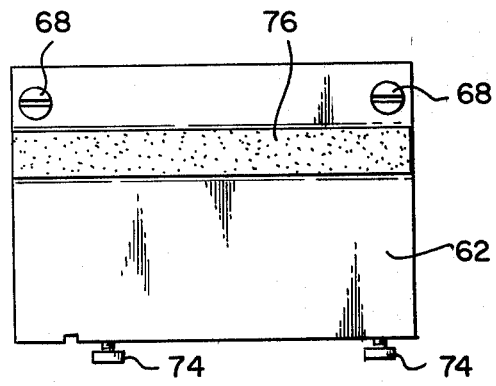
FIG. 7 is a bottom plan view of the FIG. 4 module.

To secure the mount 48 to a telephone set, spaced apart vertical mounting plates 70 and 72 are upstanding from portion 66. These plates are spaced apart horizontally a distance which substantially corresponds to the wall thickness of most molded plastic telephone sets in order to permit insertion of a portion of a conventional telephone set housing T therebetween, as shown, (FIG. 6). For positive retention of the housing T in the illustrated position, screws 74 may be threaded through plate 72 for engagement with the outer surface of housing T, although other retention means could be used, if desired. In the illustrated example, an elongated cushion 76 is secured to the underside of base 62 adjacent portion 66 for additional support of the module upon an underlying surface.

COMMUNICATION FUNCTIONS

Briefly summarizing operation of the FIG. 1 system as thus far described, each subscriber party can control the corresponding do-not-disturb and message-waiting indicators 44, 44a and 42, 42a at the central station and the respective remote station by appropriate actuation of the respective rocker switch 60. In the example, each subscriber party exclusively controls indicators 44, 44a and alternately controls indicators indicators 42, 42a. For telephone application, indicators 44, 44a additionally are controllable in accordance with the on-hook and off-hook status of the associated telephone set. The central station provides selective accessing and operation of individual remote station indicators 42, 42a. Selective accessing of a certain remote station is accomplished by entering the two digit station address on the key pad 30, verifying that the correct address has been entered by observing display 36, and then depressing key button 34. In the example, only the central station can turn on indicators 42, 42a in this manner; however, the central and remote stations can turn off indicators 42, 42a by depression of key button 32 and by appropriate actuation of the respective rocker switch 60, respectively.

The FIG. 1 system therefore can afford, among others, the following exemplary communication functions with respect to the central station and one or more remote stations on a selective individual basis:

| Function | Indicator Status |
|---|---|
| A) Message-Waiting/Received | |
| Signal an individual remote station subscriber that message-waiting | Turn on corresponding remote station indicator 42a |
| Signal central station operator that indicator 42a is turned on | Turn on counterpart central station indicator 42 simultaneously with indicator 42a |
| Signal central station operator that message-received | Turn off corresponding indicator 42 |
| B) Do-Not-Disturb | |
| signal central station operator do-not-disturb | Turn on corresponding central station indicator 44 |
| Signal remote station subscriber that indicator 44 is turned on | Turn on counterpart remote station indicator 44a |

For use with more than 20 remote station subscribers, one or two extension consoles, 10a and 10b, each containing 40 indicator pairs, may be added to the FIG. 1 console, as depicted in FIG. 2. The FIG. 2 extension consoles are generally similar to the FIG. 1 console, except that they do not contain separate keyboards. They are accessed and controlled by the FIG. 1 console to provide, in combination therewith, 60 or 100 station capacity. The FIG. 2 extension consoles are described in additional detail hereinafter with reference to FIGS. 2 and 13.

MESSAGE-WAITING COMMUNICATION

Figure 8A:
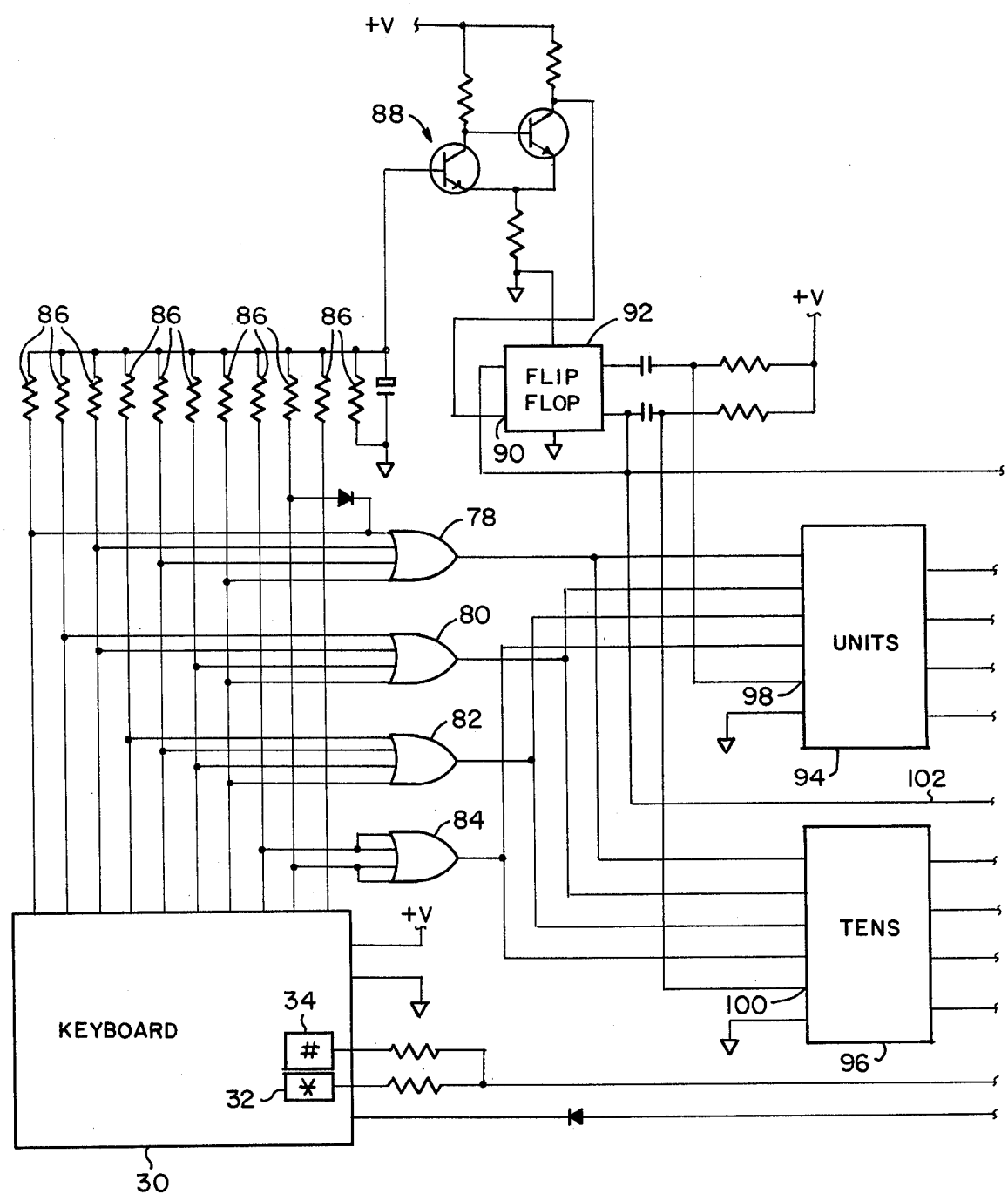
FIGS. 8A and 8B together constitute an electrical circuit diagram of the electronic control circuitry associated with the FIG. 1 console keyboard.

The message-waiting communication functions (and inverse message-received functions) are obtained by selectively accessing the remote station indicators 42a on a selective individual basis, while simultaneously accessing the respectively corresponding central station indicators 42, using the FIG. 8A, 9B circuitry. Referring first to FIG. 8A, the keyboard 30 is connected to a source of positive direct current voltage (V) so that, upon closure of a particular numbered key button, an appropriate output signal in the form of a positive pulse is delivered to one of four NOR gates 78, 80, 82, 84 as shown (FIG. 8A). These gates act as encoders which convert the keyboard signals to BCD format. The output of the keyboard is further routed via suitable current limiting resistors 86 to a two-staged transistor amplifier 88 which is gated on each time one of the numerical key buttons is depressed, thereby delivering a pulse to the clock input 90 of a flip-flop 92. The respective outputs of gates 78, 80, 82, 84 are delivered simultaneously to two sets of four inputs respectively associated with a units memory 94 and a tens memory 96. These memories store BCD information indicative of a particular digit — a units digit or a tens digit, as the case may be. The flip-flop 92 effectively stores information indicative of which digit of the two digit station address is being delivered from the keyboard and controls into which memory that information is entered by applying appropriate control signals to the control inputs 98 and 100 thereof. The flip-flop further delivers an additional control signal via line 102 for controlling operation of the central station message-waiting indicator 42 associated with the accessed remote station, as will be described presently.

Figure 8B:
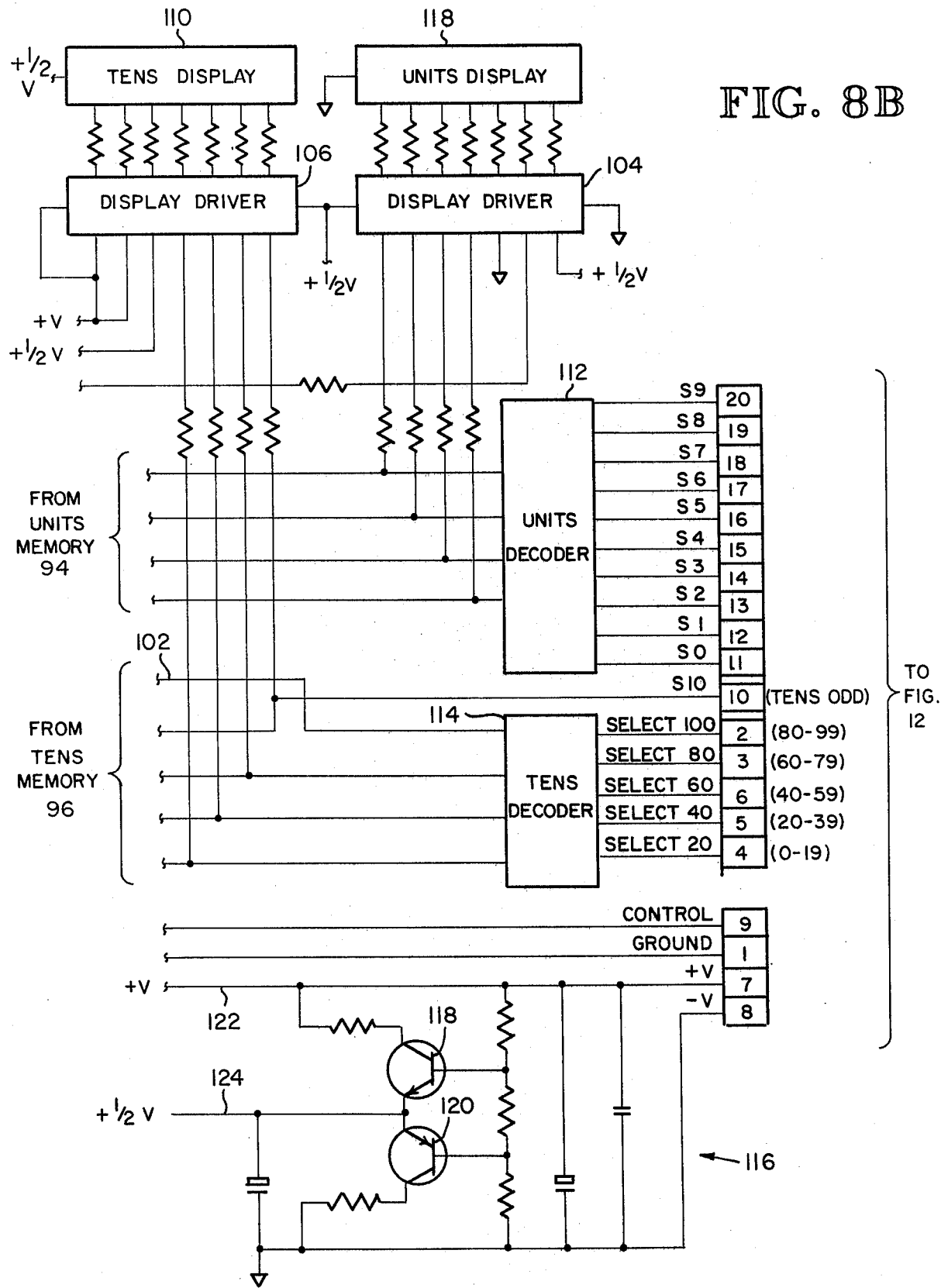

Referring now to FIG. 8B, the outputs of memories 94, 96 are respectively delivered to the inputs of display drivers 104 and 106 which respectively drive a units display 108 and a tens display 110, as shown. These displays together constitute the display 36 which is visible on the face of the FIG. 1 central console for observation by the central station operator or receptionist in order to verify that the station address information entered by the keyboard corresponds to the address of the station desired to be accessed.

The FIG. 8B displays 108, 110 are driven in series by the drive circuit generally referenced by numeral 116. Positive and negative direct current input voltages, $+V$, $-V$ are applied to control transistors 118, 120 and associated voltage divider circuitry to yield positive voltage (V) and half-voltage ($\frac{1}{2}$ V) drive signals which appear at outputs 122, 124, respectively. Units display driver 104 is connected by means not shown to be driven between zero voltage and $\frac{1}{2}$ V, and tens display driver 106 is likewise connected to be driven between $\frac{1}{2}$ V and V.

Still referring to FIG. 8B, the output of the units memory is further delivered to a units decoder 112. A digital logic signal corresponding to the units digit previously stored in the units memory now appears at one of the decoder outputs labeled S0 - S9. The output of the tens memory indicative of even increments of ten is routed to a tens decoder 114 along with the signal present on line 102 from flip-flop 92 (FIG. 8A). Decoder 114 now delivers an appropriate digital output signal at one of the labeled outputs which corresponds to 20 station groups — groups 0 - 19 being associated with the FIG. 1 console, and the remaining groups indicated being associated with the FIG. 2 extension consoles 10a, 10b as will be described presently. The output of the tens memory indicative of odd increments of ten is routed directly to output S10, as shown (FIG. 8B). The output signals which thus appear at select 20 - select 100 outputs in FIG. 8B, together with the signal (if any) present at output S10, yield an output signal(s) indicative of the tens digit previously stored in memory 96.

In addition to the output signals which appear at the aforementioned FIG. 8B outputs, a control signal and a ground signal also appear simultaneously therewith, as shown (FIG. 8B). The latter signals constitute analog control signals for controlling the individual signalling paths which are respectively associated with the remote stations, as well as the message-waiting indicators 42, 42a. Referring again to FIG. 8A, key button 34 (# symbol) is connected to the positive voltage source (V) so that depression of button 34 causes a positive control voltage to appear at the FIG. 8B control output. Key button 32 (* symbol) is connected to ground so that depression of button 32 causes zero voltage to be established at the FIG. 8B ground output.

Figure 12:
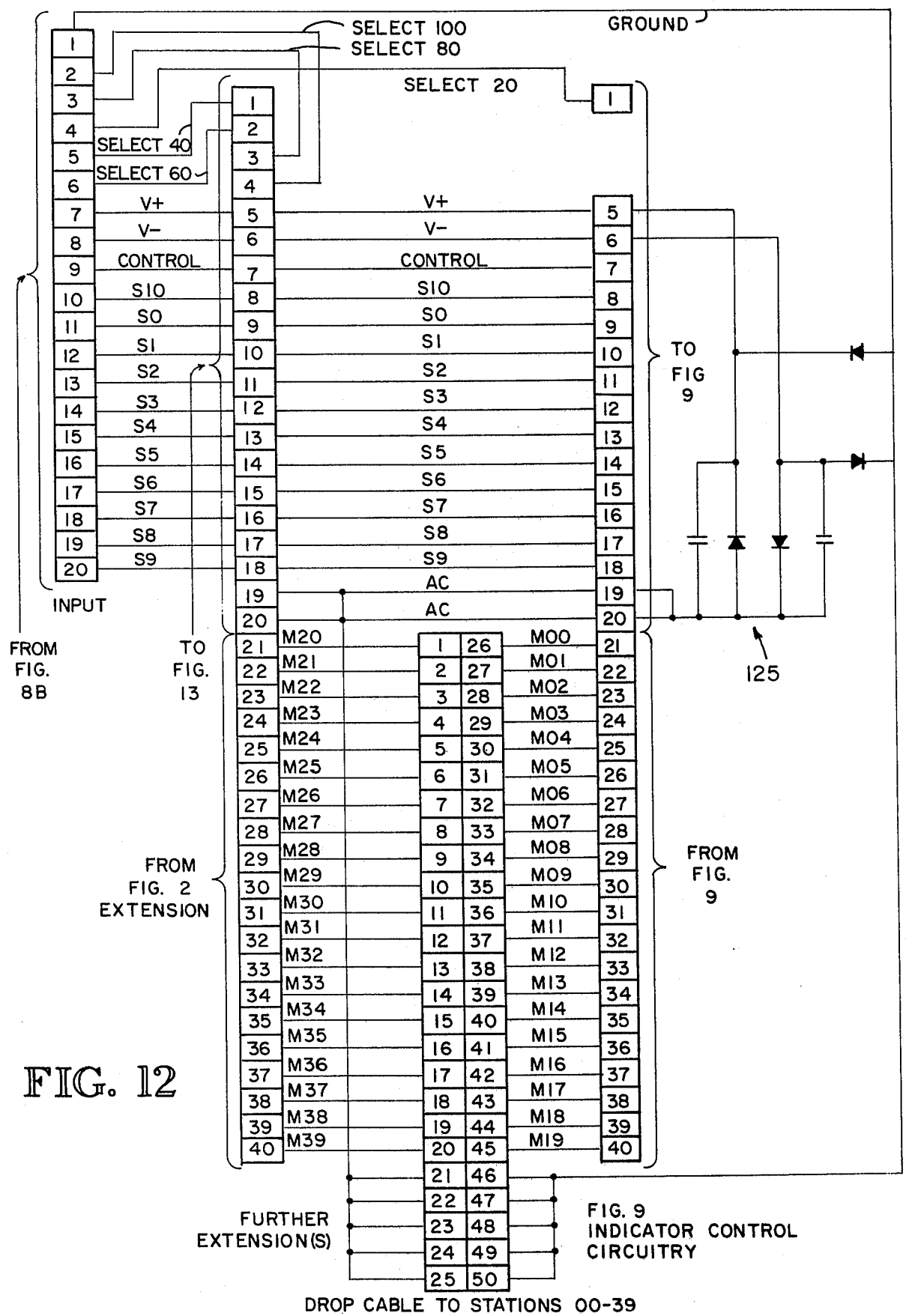
FIG. 12 is an electrical circuit diagram of the FIG. 1 central station console connector circuitry.

In the illustrated example, the FIG. 8B output signals are routed by appropriate output pin connectors (represented by individually numbered boxes labeled 1 - 20) to corresponding input pin connectors associated with the FIG. 12 keyboard connector circuitry. Referring now to FIG. 12, the individual FIG. 12 input pin connectors are labeled with corresponding pin number and signal reference designations. The signals which are presented to the FIG. 12 input pin connectors are routed alternatively to the FIG. 2 extensions (if any) and to the FIG. 9 indicator circuitry (to be described presently), depending upon the particular group select signal which appears at input pins 2 - 6. To access stations addressed 00 - 19, the FIG. 12 circuitry further receives message signals referenced by M00 - M19 from the FIG. 9 circuitry and routes those signals to the accessed station of station group 00 - 19 via a conventional drop cable. In the illustrated example, the FIG. 12 circuitry likewise receives generally similar message signals (referenced by M20 - M39) from extension 10a and routes the latter to the accessed station of station group 20 - 39. In addition to the aforementioned routing functions, the FIG. 12 circuit additionally includes a power supply 125 for yielding the direct current voltage signals +V, —V which are routed via respective pin pairs 5,6; 5,6 and 7,8 to the FIG. 8A, 8B circuitry. Power supply 125 thus constitutes the power supply for individually driving the FIG. 8A, 8B circuit, although other power supplies may be used.

Figure 9:
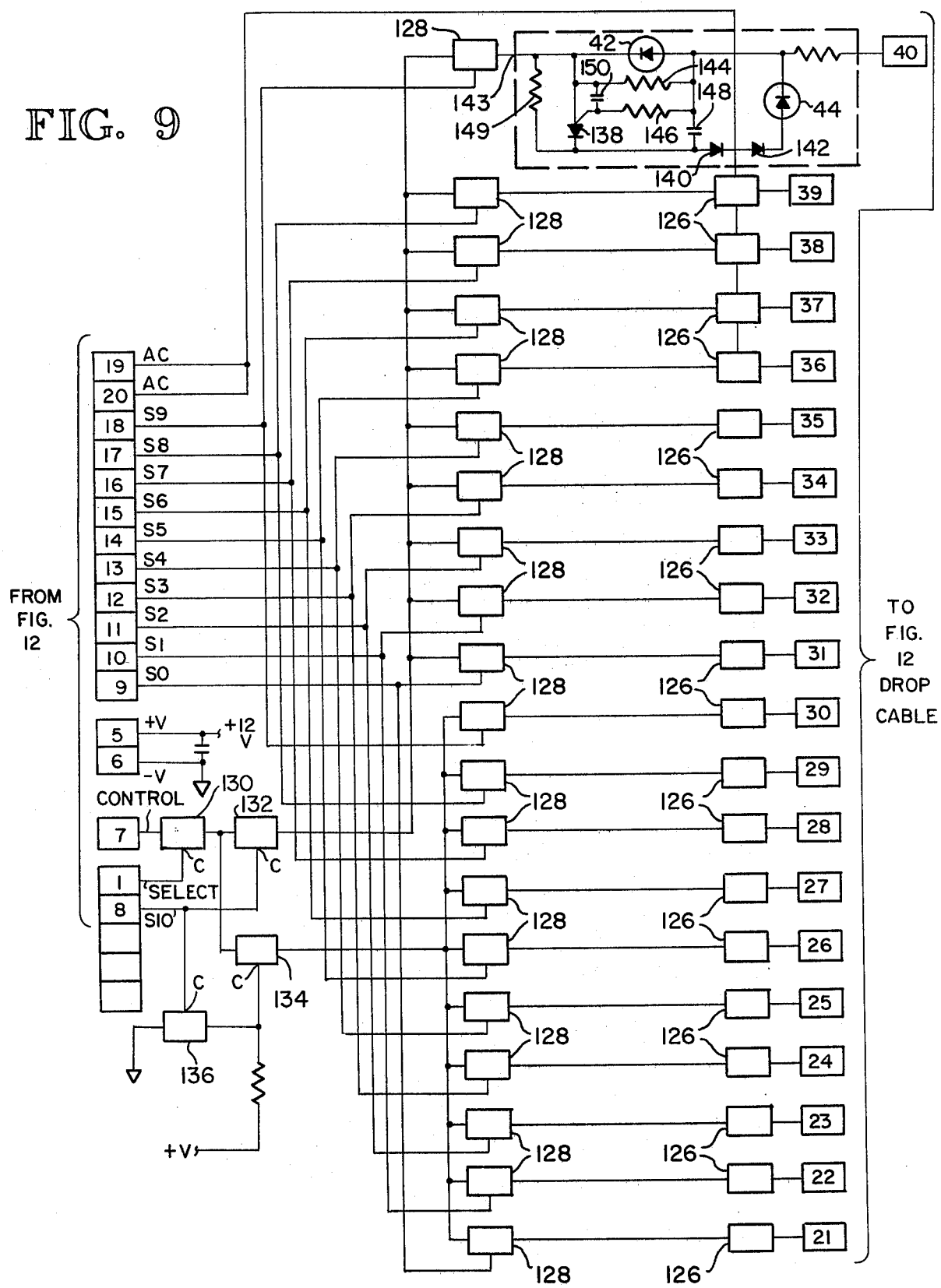
FIG. 9 is an electrical circuit diagram of the electronic control circuitry associated with the FIG. 1 console message-waiting and do-not-disturb indicators.

Referring now to FIG. 9, the output signals which appear at the FIG. 12 output pins 1, and 5 - 20 in response to selection of a station within station group 00 - 19 are routed to corresponding FIG. 9 inputs bearing the same reference designations in order to effect appropriate message-waiting indication at the respective FIG. 1 central station indicator 42 and, simultaneously therewith, a corresponding indication at the corresponding remote station indicator 42a. The remote stations of group 00 - 19 are connected to FIG. 9 output pins 21 - 40 by individual signalling paths associated with the FIG. 12 drop cable. These signalling paths will be described in further detail hereinafter with reference to FIG. 10. Central station indications incident to the remaining stations, if any, are provided with respect to the FIG. 2 extensions and remote stations 20 - 99, as will be described.

The FIG. 9 circuitry includes a plurality of generally similar latch circuits 126 (only one shown in detail) for controlling the individual signalling paths and associated message-waiting indications, together with analog switches 128 — one switch 128 associated with and adapted to control each circuit 126 in response to analog control signals routed from the central station keyboard buttons 32 and 34 (FIG. 1). Additional analog switches 130, 132, 134 and 136 steer these control signals to the appropriate latch circuit. One type of analog switch suitable for use in this invention is a COS/MOS quad bilateral switch manufactured by RCA and designated model CD 4016 AE. With its control input high, the analog switch is turned on and it allows any analog signal which is applied at its input to appear at its output. With its control input low, the analog switch constitutes an open circuit. It will be recognized, of course, that other types of switches may be used in place of the illustrated analog switches.

Still referring to FIG. 9 each input S0 - S9 applies a control signal to the control inputs of two switches 128 as shown. To operate a certain FIG. 9 switch of that pair, an analog control signal (produced by depression of the FIG. 8A key button 34) is delivered at the FIG. 9 control input, in combination with appropriate routing signals. The analog control signal will be transmitted by switch 130 provided the appropriate group select signal (in this case, select 20) is applied to the control input C thereof. The analog control signal then is routed alternatively through switches 132 and 134, depending upon whether a signal indicative of tens — odd appears at input S10. To this end, the control input C of the switch 134 is controlled by alternative application of zero voltage from ground via switch 136 and of positive voltage as shown (FIG. 9). Additionally, alternating current electrical power is applied at inputs AC and is routed to the latches 126 for driving the individual signalling paths respectively associated with output pins 21 - 40.

Each illustrated latch circuit 126 (only one shown in detail in FIG. 9) includes a programmable uni-junction transistor (PUT) 138. Indicator 42 is connected with the PUT anode so that, when the PUT is conductive, indicator 42 will be operative. The output of the latch is routed via blocking diodes 140, 142 to indicator 44, diodes 140, 142 thus causing half-wave rectified AC power to be applied to the PUT. The PUT is turned on when its anode voltage is pulled more positive than its gate voltage, and, when turned on in this manner, the PUT latches and remains on until these voltage conditions are altered.

To operate each latch circuit, the aforementioned analog control signals in the form of appropriate voltage levels (positive and zero — produced by depression of FIG. 8A, key buttons 34 and 32, respectively) are routed to the correct latch circuit 126 as described and control its PUT 138. More specifically, in the absence of any signal at the input 143 to the latch circuit, the resistors 144, 146 maintain the PUT anode and gate at essentially the same voltage and, hence, the PUT remains off. In the absence of a positive voltage signal at input 143 resistor 149 causes the PUT anode voltage to remain negative with respect to gate voltage. Upon application of a positive voltage control signal to input 143 of the illustrated latch circuit (produced by depression of FIG. 8A key button 34), the PUT anode voltage is pulled relatively positive with respect to its gate voltage and, hence, the PUT will turn on, thereby actuating indicator 42 during successive corresponding half cycles of this AC wave form. The PUT is maintained in this condition by a capacitor 148 which stores sufficient charge to maintain the PUT in its latched condition during off-cycle portions of the AC wave form. Resistor 144, in conjunction with indicator 42, provide a current path from capacitor 148 to the PUT. Consequently, the PUT does not turn off in the absence of a positive input control signal. To deactuate indicator 42 from the central station, the latch control input 143 is pulled negative by application of a zero voltage (produced by depression of FIG. 8A key button 32) to input 143 so that the PUT anode is pulled to a voltage which is relatively negative with respect to its gate, thereby turning off the PUT and breaking the current path through the indicator 42. To deactuate indicator 42 from the remote station associated therewith (in the illustrated case, the remote station connected with output pin 40), the current path from that remote station is interrupted by appropriate actuation of the remote station module rocker switch. The capacitor 148 then discharges to the point that the PUT anode voltage is no longer more positive with respect to its gate voltage and the PUT is turned off. To minimize sensitivity of the FIG. 9 latch circuits to noise and voltage transients, a capacitor 150 may be connected between resistors 144, 146, as shown.

DO-NOT-DISTURB COMMUNICATION

Figure 10:
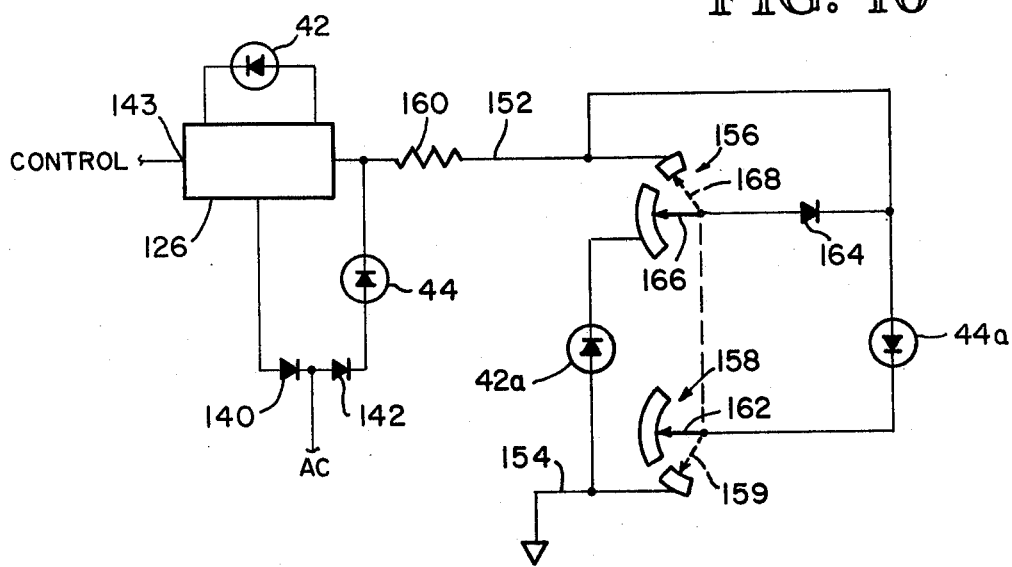
FIG. 10 is an electrical circuit diagram of the electronic circuitry associated with one individual signalling path between the FIG. 1 console and one FIG. 1 remote station module, together with the control circuitry respectively associated therewith.

The rocker switch 60 at each remote station module exclusively controls the on-off status of both corresponding indicators 44, 44a. The central station console exclusively turns both corresponding indicators 42, 42a on; however, the console and the module alternately turn both indicators 42, 42a off. Referring now to FIGS. 9 and 10, the central station is operatively connected with each remote station module by a pair of electrical leads — a single lead 152 (FIG. 10) connected with a respective FIG. 9 output pin 21 – 40, and a ground lead 154 (FIG. 10). Alternating current electrical current is impressed upon these leads via the FIG. 9 AC inputs and associated blocking diodes 140, 142 and hence alternately flows in opposite directions about the current path between the central station and remote station module during alternate positive and negative half cycles of the AC wave form. In the example, indicators 44, 44a are actuated during positive half cycles of the AC wave form, whereas indicators 42, 42a are actuated during negative half cycles of the AC wave form. The latch circuit 126 thus controls the on-off status of both indicators 42, 42a; yet does not affect the on-off status of the indicators 44, 44a. Rocker switch exclusively controls the latter, and alternately turns off indicators 42, 42a.

Referring now in particular to FIG. 10, each remote station module is connected with the central station by generally similar signalling paths. A typical path is depicted in FIG. 10, together with the respectively associated FIG. 9 central station latch circuit 126, indicators 42, 44, blocking diodes 140, 142 and AC input. In the illustrated example, the rocker switch 62 is a two pole, three position switch which includes ganged contacts 156 and 158. For do-not-disturb communication, switch contacts 158 are positioned in their lower closed position, depicted in broken lines 159. A current path therefore is established from central station indicator 44, current limiting resistor 160, the remote station indicator 44a and the now closed switch contacts 158 to ground during positive half cycles of the AC wave form. This circuit will remain closed until the switch contacts 158 are returned to their intermediate opened position, depicted in solid lines 162, at which indicators 44, 44a are deactuated simultaneously. For message-waiting communication, latch 142 establishes a circuit for actuating indicators 42, 42a via switch contacts 156 and diode 164 during negative half cycles of the AC wave form — switch 156 normally being in its normally closed intermediate position depicted in solid lines 166. For message-received communication, switch contacts 156 are positioned momentarily in their upper opened position, depicted in broken lines 168. This action causes the latch circuit 126 to unlatch in order to deactuate indicators 42, 42a simultaneously.

CALL STATUS COMMUNICATION

Figure 11:
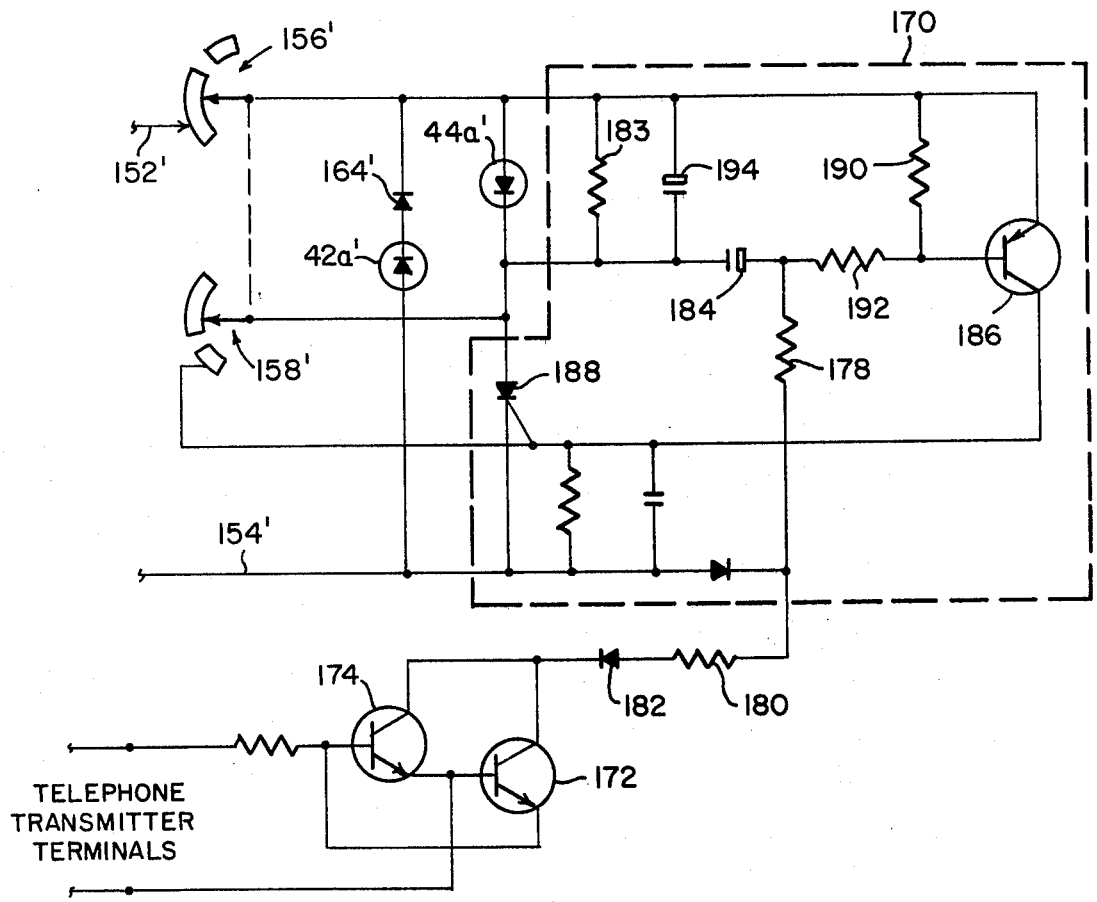
FIG. 11 is an electrical circuit diagram generally similar to a portion of FIG. 10, depicting modified remote station module control circuitry.

The FIG. 11 circuit provides call status indication in addition to the do-not-disturb and message-received communication functions accomplished by the FIG. 10 circuit just described. Portions of the FIG. 11 circuit which accomplish the latter two functions are generally similar in structure and operation to the FIG. 4 circuit and are not further described herein, like parts being designated with the same reference numerals, primed. The FIG. 11 circuit includes a multi-vibrator (enclosed within the broken lines generally referenced by numeral 170) which causes indicators 44, 44a to flash simultaneously at a predetermined rate whenever the telephone associated with the remote station module assumes off-hook status, and maintains those indicators in their flashing modes until the associated remote station telephone resumes on-hook status.

Transistors 172, 174 are connected electrically to the telephone network or to the phone transmitter terminals. These transistors effectively detect application of electrical power to the telephone microphone and are alternatively rendered conductive, depending upon the polarity. Transistor 172 or 174 establishes a current path through resistors 178 and 180, blocking diode 182 and the now conductive transistor 172 or 174, together with resistor 183, for charging capacitor 184. When carged sufficiently, capacitor 184 causes a control voltage to be applied to the base of transistor 186 which thereupon causes current to flow in its collector circuit. The latter is applied to the gate of SCR 188 which, in response thereto, is now turned on. Operation of SCR 188 in turn causes the voltage drop across indicator 44a' to be pulled negative until indicator 44a' is actuated. Indicator 44a' remains actuated for a time period determined by the time needed for current flow through resistors 190, 192, 178 to reduce sufficiently that capacitor 184 can discharge in order to cause transistor 186 (and hence SCR 188) to be turned off. At this time, indicator 44a' is deactuated and remains so until the current flow via the transistor 172 or 174 again charges capacitor 184 to the point that transistor 186 and SCR 188 are rendered conductive. This process is repeated at a predetermined frequency. To minimize 60 cycle flicker effects, capacitor 194 may be provided in parallel with indicator 44*a*' as shown (FIG. 11).

As thus far described, message-waiting and do-not-disturb communication is provided between the central station and one or more remote stations within station group 00 - 19. For service with additional stations within station groups 20 - 59, or 60 - 99 in addition, the FIG. 2 extensions 10*a*, or 10*b* or both may be used in combination with console 10. Referring again to FIG. 2, each extension includes upper and lower sets of indicators, each set composed of twenty indicator pairs which are generally similar to the FIG. 1 indicators 42, 44. Each such set is controlled by a respective circuit generally similar to the FIG. 9 circuitry described previously under control of the FIG. 8A, 8B circuit on the basis of the aforementioned group select signals. The FIG. 1 console 10 is connected with extension 10*a* by flat cable 200, and extension 10*a* is connected to extension 10*b* by a second generally similar cable 202.

Figure 13:
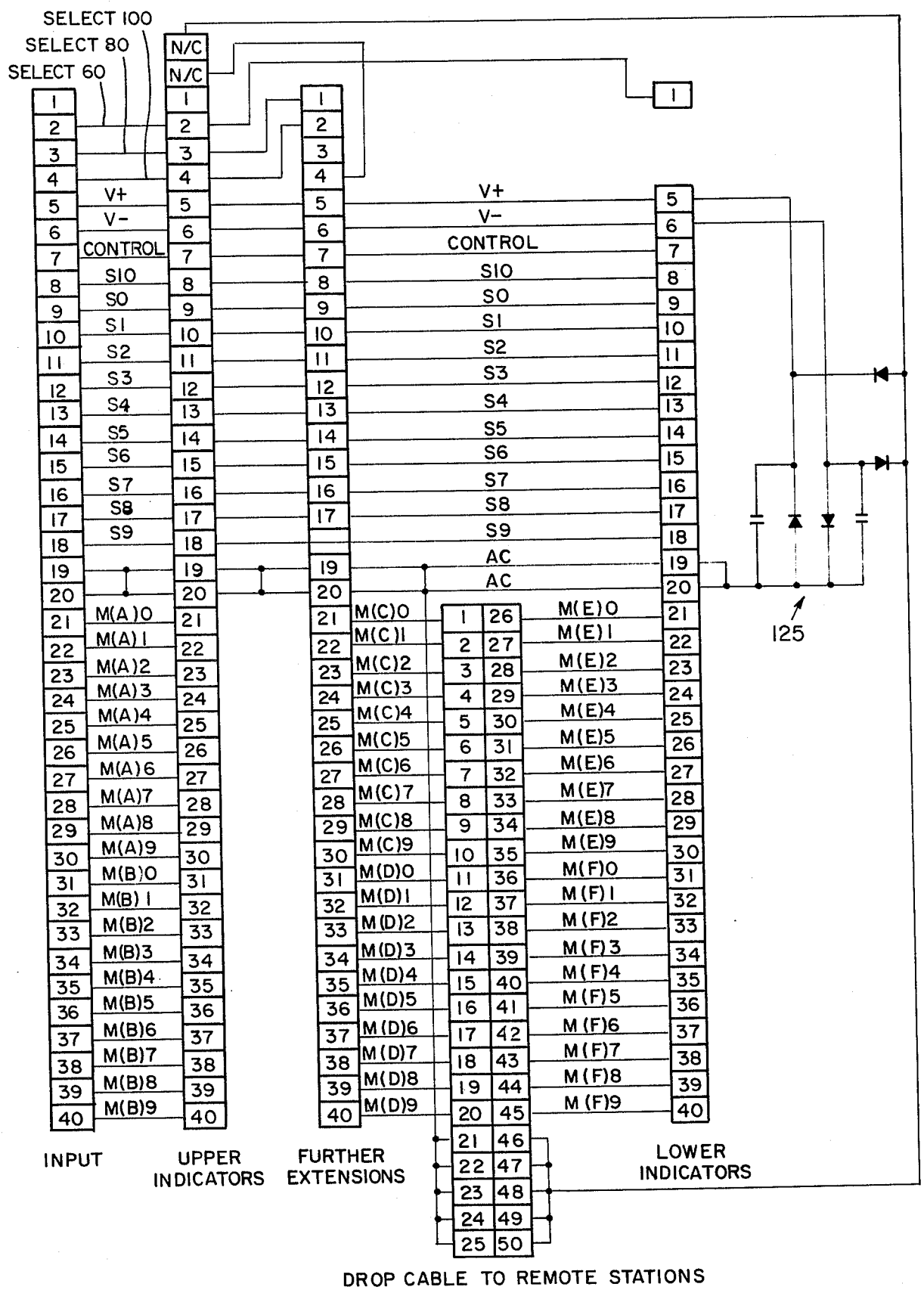
FIG. 13 is an electrical circuit diagram generally similar to FIG. 12 of the FIG. 2 console extensions connector circuitry.

Each extension additionally includes a generally similar connector circuit depicted in FIG. 13. Regarding extension 10*a*, the FIG. 13 letters A, B, C, D, E, F associated with the M prefix signals correspond to numerals 2, 3, 6, 7, 4 and 5, respectively. Regarding extension 10*b*, the letters A, B, E and F correspond to numerals 6, 7, 8 and 9, respectively (letters C and D not used with respect to extension 10*b*). The FIG. 13 circuit as applied to both extensions 10*a*, 10*b* operates in a manner generally similar to the FIG. 12 circuit (like signals, pin connectors etc. referenced by the same designations) except that the indicator signals are routed with respect to two indicator sets (upper and lower). The FIG. 1 console 10 selectively controls which indicator set of which extension is to be operated by appropriate routing of the aforementioned FIG. 8B output signals in relation to the particular station group selected from stations addressed 20 - 99. It will be recognized that the present invention may be modified to provide service with even greater numbers of remote stations, if desired.

Although one preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

The embodiments of the invention in which an exclusive property or privilege is claimed are defined as follows.

1. A communication system comprising: a central station including do-not-disturb indicator means, a remote station including message-waiting indicator means, central station control means located at said central station for transmitting a message-waiting signal, remote station control means located at said remote station for transmitting a do-not-disturb signal, and means providing a message-waiting communication channel and a do-not-disturb communication channel between said central station and said remote station for respectively transmitting a message-waiting signal from said central station control means to said message-waiting indicator means to effect message-waiting indication at said remote station and a do-not-disturb signal from said remote station control means to said do-not-disturb indicator means to effect do-not-disturb indication at said central station.

2. The system of claim 1, wherein said central station includes message-waiting indicator means operable simultaneously with the message-waiting indicator means located at said remote station to indicate transmission of a message-waiting singal from said central station control means to the message-waiting indicator means located at said remote station, and said remote station control means include means connected with said message-waiting communication channel for terminating such message-waiting signal transmission independently of said central station control means in order to indicate message-received.

3. The system of claim 1, wherein said remote station control means are so connected with said do-not-disturb communication channel that said central station control means are prevented from controlling operation of said do-not-disturb indicator means.

4. The system of claim 1, wherein said remote station control means include means for actuating and deactuating said do-not-disturb indicator means at a predetermined frequency.

5. The system of claim 1, wherein said means providing a message-waiting communication channel and a do-not-disturb communication channel includes a signal electricl conductor extending between said central station and said remote station, and means for applying alternating electrical current to said single conductor such that electrical current flow in one direction constitutes a message-waiting signal and electrical current flow in a direction opposite said one direction constitutes a do-not-disturb signal.

6. The system of claim 1, wherein said central station control means include latch means connected with said message-waiting communication channel to permit message-waiting signal transmission therealong when latched, and latch control means for selectively causing said latch means to latch and unlatch, and wherein said remote station control means include means for alternatively causing said latch means to unlatch in order to terminate message-waiting signal transmission along said message-waiting communication channel.

7. The system of claim 6, wherein said latch control means include analog switch means for selectively operating said latch means.

8. The system of claim 1, further comprising means providing a message-waiting communication channel and a do-not-disturb communication channel between said central station and each of a plurality of remote stations, each including message-waiting indicator means and remote station control means, said central station further including a plurality of do-not-disburb indicator means respectively corresponding with said remote stations, said central station control means including means for accessing said message-waiting communication channels on a selective individual basis such that message-waiting signals can be transmitted independently from said central station control means to the plurality of message-waiting indicator means along the message-waiting communication channels respectively associated therewith to effect respective message-waiting indications at the remote stations, each said remote station control means being operative to transmit a do-not-disturb signal along the do-not-disturb communication channel associated therewith to the corresponding do-not-disturb indicator means to effect do-not-disturb indication at said central station.

9. The system of claim 8, wherein said central station control means include a plurality of latch means respectively connected with said message-waiting communication channels to permit message-waiting signal transmission therealong when latched, and latch control means for selectively causing said plurality of latch means to latch and unlatch independently, and wherein said remote station control means include means for alternatively causing the latch means connected with the message-waiting communication channel respectively associated therewith to unlatch in order to terminate message-waiting signal transmission therealong.

10. The system of claim 9, wherein said latch control means include analog switch means for selectively accessing and operating said latch means.

11. The system of claim 8, wherein said means providing a message-waiting communication channel and a do-not-disturb communication channel between said central station and each of a plurality of remote stations includes a single electrical conductor extending between said central station and each remote station, and means for applying alternating electrical current to each said single conductor such that electrical current flow in one direction constitutes a message-waiting signal and electrical current flow in a direction opposite said one direction constitutes a do-not-disturb signal.

12. The system of claim 8, further comprising means operatively associated with said central station control means for indicating the remote station accessed.

13. The system of claim 12, wherein said remote stations are represented by respective multiple digit numerical designations, and wherein said indicating means include electronic display means for respectively displaying said digits, and further comprising means for driving the respective display means by applying electrical power thereto in series relationship.

14. The system of claim 8, wherein said central station control means include keyboard means for entering a two digit station address corresponding to an individual remote station, encoder means operatively associated with said keyboard means for encoding the station address entered, storage means operatively associated with said encoder means for storing the encoded station address, means operatively associated with said storage means for displaying the stored station address, and routing means including analog switch means operatively associated with said storage means for routing a message-waiting signal to the message-waiting indicator means associated with the remote station having a corresponding station address via the respectively associated message-waiting communication channel.

15. A communication system for use with a telephone system, comprising: a central station including a telephone set, and a plurality of remote stations including respective telephone sets, means providing individual signalling paths between said central station and said remote stations independent of telephone communication paths associated therewith, means located at said central station for transmitting individual message-waiting signals to said remote stations along the signalling paths respectively associated therewith, means located at each remote station for receiving an individual message-waiting signal and effecting a message-waiting indication, means located at each remote station for transmitting an individual do-not-disturb signal to said central station along the signalling path associated therewith, and means located at said central station for receiving individual do-not-disturb signals and effecting corresponding do-not-disturb indications.

16. The system of claim 15, wherein said means for transmitting a do-not-disturb signal include call status indication means for transmitting a do-not-disturb signal in response to operation of the associated telephone set.

17. The system of claim 16, wherein said call status indication means include means for transmitting a do-not-disturb signal at a predetermined frequency.

18. The system of claim 15, wherein each remote station includes housing means operatively associated with the respective telephone set for mounting said means for transmitting an individual do-not-disturb signal and said message-waiting indicating means, and further comprising means mounted by said housing for indicating the status of the respectively associated central station do-not-disturb indication.

19. The system of claim 18, further comprising mounting means for mounting said housing means from the respective telephone set.

20. The system of claim 19, wherein each telephone set includes a case, and said mounting means include a base, two members upstanding from said base, said members being spaced apart sufficiently so that a portion of the case may be positioned therebetween, and means operatively associated with said members for engaging said case portion and maintaining said housing means in fixed relation with respect to the respective telephone set.

21. A telephone module for a telephone message-waiting and do-not-disturb communication system, said module comprising: mounting means for mounting said module on a telephone set; first visual indicator means for indicating message-waiting; second visual indicator means for indicating the status of do-not-disturb indicator means spaced therefrom; and switch means for alternatively controlling said first and second visual indicator means.

22. The module of claim 21, wherein the telephone includes a case, and said mounting means include means for engaging and supporting the module from the case.

23. A control console for a message-waiting and do-not-disturb communication system, said consle comprising: a housing; indicator means mounted on said housing and including a plurality of visual message-waiting indicators and a plurality of visual do-not-disturb indicators; keyboard means mounted on said housing for producing a message-waiting signal corresponding to a selected one of said message-waiting indicators; and routing means mounted on said housing and operatively associated with said keyboard means and said indicators for (1) routing a message-waiting signal to a remote location while simultaneously therewith actuating a selected one of said message-waiting indicators, (2) receiving a message-received signal from a remote location and deactuating a selected one of said message-waiting indicators, and (3) receiving a do-not-disturb signal from a remote location and actuating a selected one of said do-not-disturb indicators.

24. The control console of claim 23, further comprising means mounted on said housing adjacent said keyboard means and operatively associated therewith for indicating routing of each message-waiting signal.

25. The control console of claim 23, further comprising a second housing, indicator means mounted on said second housing and including a plurality of visual message-waiting indicators, and visual do-not-disturb indicators, means mounted on said second housing and operatively associated with the firstmentioned routing means for (1) routing a message-waiting signal to a remote location while simultaneously therewith actuating a selected one of the second housing message-waiting indicators, (2) receiving a message-received signal from a remote location and deactuating a selected one of said second housing message-waiting indicators, and (3) receiving a do-not-disturb signal from a remote location and actuating a selected one of said second housing do-not-disturb indicators.

26. A circuit providing a bi-directional signalling path for transmitting a message-waiting signal from a first communication station to a second communication station, and transmitting a do-not-disturb signal from the second communication station to the first communication station, comprising: a single electrical conductor extending between the first communication station and the second communication station; means located at one of said first and second communication stations providing a ground connection to said single conductor; and means located at the other of said first and second communication stations for applying alternating electrical current to said single conductor such that electrical current flow in one direction constitutes a message-waiting signal and electrical current flow in a direction opposite said one direction constitutes a do-not-disturb signal.

* * * * *

UNITED STATES PATENT AND TRADEMARK OFFICE
CERTIFICATE OF CORRECTION

PATENT NO. : 4,086,441
DATED : April 25, 1978
INVENTOR(S) : Richard J. Ullakko and Gerald L. Edwards It is certified that error appears in the above-identified patent and that said Letters Patent are hereby corrected as shown below:

In the drawings, Sheet 1, Fig. 1, change reference numeral "22a" to --24a--; Sheet 4, Fig. 8B, change reference numeral "118" associated with the unit display to --108--.

In the Abstract, line 19, change "bidirectional" to --bi-directional--.

Column 2, line 1, change "state" to --station--; line 5, change "application" to --applications--.

Column 3, line 53, change "similar)." to --similar.)--.

Column 4, line 9, insert --herein-- following "described".

Column 5, chart entry B), change "signal" to --Signal--.

Column 6, line 19, change "9B" to --8B--; line 65, change "not shown" to --(not shown)--.

Column 10, line 54, change "carged" to --charged--.

Claim 5, line 3, change "signal" to --single--; line 4, change "electricl" to --electrical--.

Claim 25, line 6 change "firstmentioned" to --first-mentioned--.

Signed and Sealed this

Twenty-fourth Day of July 1979

[SEAL]

Attest:

LUTRELLE F. PARKER

Attesting Officer        Acting Commissioner of Patents and Trademarks